June 27, 1939. L. G. JENNESS 2,163,602
CATALYST FOR AND PROCESS OF SELECTIVELY CARRYING OUT CATALYTIC REACTIONS
Original Filed March 30, 1935
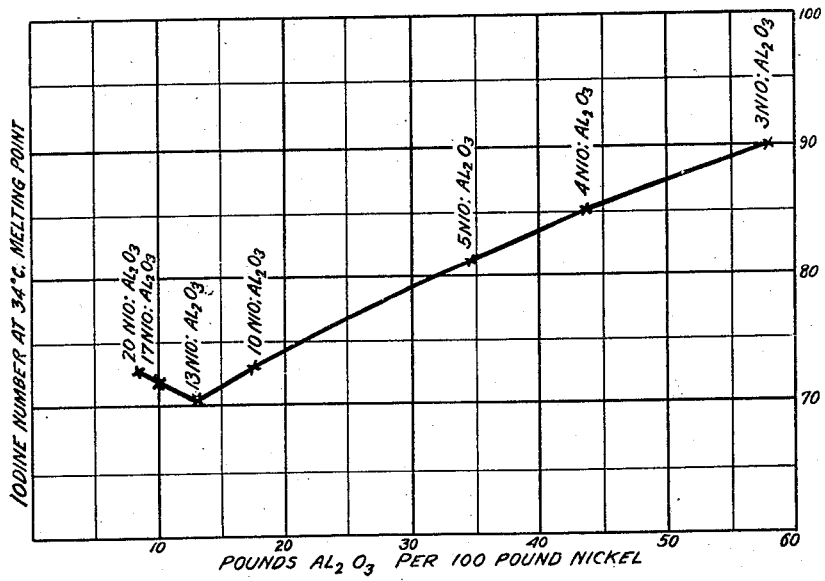
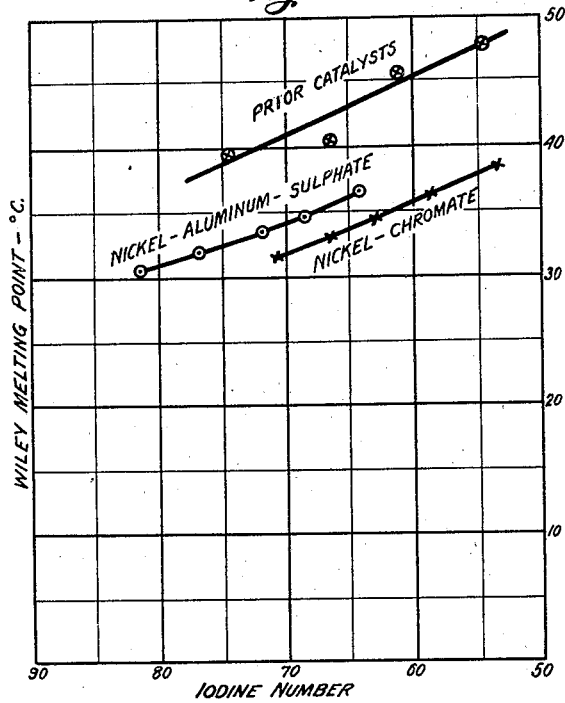
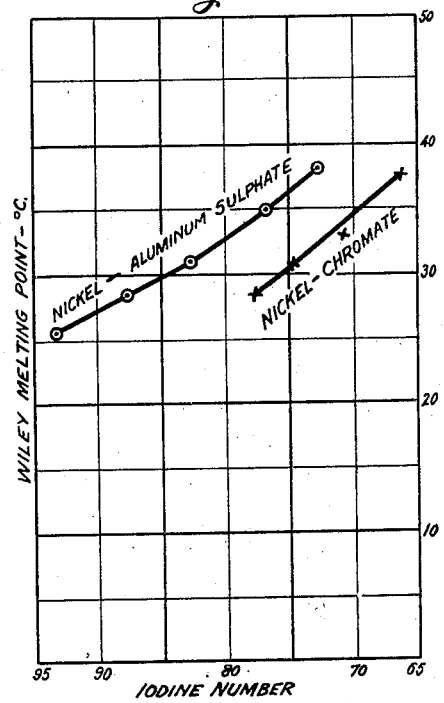
Inventor
Leslie G. Jenness
By Bacon & Thomas
Attorneys Patented June 27, 1939

2,163,602

UNITED STATES PATENT OFFICE 2,163,602

CATALYST FOR AND PROCESS OF SELECTIVELY CARRYING OUT CATALYTIC REACTIONS

Leslie G. Jenness, Brooklyn, N. Y., assignor to Intermetal Corporation, Newark, N. J., a corporation of Delaware Application March 30, 1935, Serial No. 13,972
Renewed January 13, 1938

10 Claims. (Cl. 23—233)

This invention relates to a catalyst and process of selectively carrying out catalytic reactions and more particularly to a process of selective catalytic hydrogenation.

The catalyst of the present invention is particularly adapted for the selective hydrogenation of glyceride oils containing large proportions of olein and linolein and substantial quantities of linolenin or even higher unsaturates such as clupanodonic glycerides, although the catalyst has important advantages in hydrogenating oils which do not contain linolenin or higher unsaturates or oils in which the olein content is relatively low.

In hydrogenation processes, it has become conventional to assume that vegetable and animal oils consist of the glycerides of stearic acid and the glycerides of unsaturates of stearic acid. It has been found that there is a tendency for the higher unsaturates to absorb hydrogen before the lesser unsaturates in the following order:

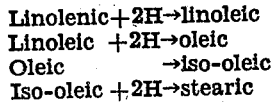

The following side reactions possibly also occur to some extent:

Of course, the acids themselves are not present but are attached as radicals to glyceride radicals to form tri-glycerides. The oils contain mixed as well as normal tri-glycerides.

For convenience in the following specification the glyceride terminology has been employed to mean the various acid radicals attached to glyceride radicals irrespective of whether they are combined as mixed or normal tri-glycerides.

Iso olein and stearin have higher melting points than the other constituents and, at least in the normal glycerides, are solid at ordinary temperatures and the remainder liquid. Olein is the most desirable constituent of glyceride oils since it is liquid and is very stable against oxidation or rancidity and also as high shortening qualities. Both linolein and linolenin are unstable, and if an oil of good keeping qualities is to be obtained, linolenin must be substantially eliminated and the linolein content substantially reduced. If a liquid oil such as a salad oil is to be produced, the formation of iso-olein or stearin is undesirable, and even if a semi-solid fat such as a shortening is to be produced, it is important to delay the formation of any substantial quantities of solid fats until the olein concentration has become relatively high and the linolein content small. Also the maintenance of a small ratio of iso-olein to stearin in semi-solid fats, particularly for shortening fats, is of importance since the presence of substantial quantities of iso-olein decreases the olein content for a given melting point, which results in a lower shortening value for the fat.

A selective catalyst must be capable of converting lnlolenin and linolein into olein without the formation of substantial quantities of stearin and iso-olein. While most catalysts employed for hydrogenation of glyceride oils exhibit a tendency to partially saturate the higher unsaturates before converting olein into stearin, as the olein concentration increases, a break-down point is quickly reached. By "break-down point" I means the point at which the catalyst is unable to function against the increased olein concentration and iso-olein and saturated glycerides begin to form with rapidity. A highly selective catalyst may be defined as one which will function against a high olein without the formation of substantial quantities of iso-olein or saturates. I have found that such a catalyst will also cause disappearance of linolenin or higher unsaturates at a high iodine number and will also produce a low melting point semi-solid fat with small linolein content since the linolein will be largely converted into olein before the break-down occurs. The catalyst contemplated by this invention will also selectively convert linolein into normal olein rather than to iso-olein so as to produce a low ratio of iso-olein to olein. The olein concentration referred to is the concentration at the surface of the catalyst and not necessarily the average of the entire body of oil undergoing hydrogenation.

It has not heretofore been known that the selectivity of a catalyst could be varied. The desideratum has been to increase the activity of catalysts, that is, to make catalysts capable of speeding up all of the hydrogenation reactions hereinbefore described. I have discovered, however, that the selectivity of a catalyst is to a large extent independent of its activity and that the selectivity can be varied within wide limits. The catalyst of the present invention is, however, an extremely active catalyst.

It is, therefore, an object of the invention to provide an improved catalyst having greater selective characteristics than those heretofore known.

Another object of the invention is to provide a catalyst which will selectively hydrogenate higher unsaturates of glyceride oils into olein in the presence of increased concentrations of olein.

Another object of the invention is to provide a catalyst which will convert the higher unsaturates into olein without the formation of substantial quantities of iso-olein.

A further object of the invention is to provide a process of making a selective catalyst.

A still further object is to provide a process of making a selective catalyst in which the selectivity of the product can be controlled within wide limits.

Other objects and advantages of the invention will appear in the following specification and the drawing, of which:

Figure 1 is a curve showing the relative selectivity of catalysts prepared from different aggregates;

Figure 2 is a graph showing the relative selectivity of catalysts according to this invention; and Figure 3 is a graph showing a comparison of catalysts according to the present invention and prior catalysts.

The catalyst of the present invention is of the same general type disclosed in my prior Patent No. 1,937,489, patented November 28, 1933, and the present product and process constitute an improvement over said patent. By varying the structure of this type of catalyst, I have discovered that the selective characteristics thereof may be widely varied.

In making a catalyst according to the present invention, an aggregate is formed by precipitating a solution of a nickel compound and a compound of a second element. The precipitated compound of the second element must be one which is not soluble in the precipitating and washing solutions but which is soluble in a subsequent leaching solution. The preferred compounds are nickel sulphate and sodium dichromate, which salts are dissolved in the same water solution, after which a precipitate is formed by adding caustic soda. The precipitate is filtered from the solution and washed until the aggregate forming the filter cake is substantially free of soluble sulphates and chromates. The filter cake is then dried until it will readily crumble in the hand and is dry enough to grind.

The dried aggregate apparently contains a compound of nickel, chromium, and oxygen. For convenience in describing this aggregate and similar aggregates, they may be considered as mixtures of nickel oxide and other oxides although it is understood that the oxides are in chemical union. The ratio of nickel oxide to chromium trioxide in the aggregate is of extreme importance in determining the selectivity of a catalyst. The molecular ratio of nickel oxide to chromium trioxide is preferably approximately 6:1, as expressed by the formula $6NiO.CrO_3$. The selectivity of the catalyst decreases as this ratio is made greater or larger than approximately 6:1.

In forming the aggregate, the ratio of nickel oxide to chromium trioxide obtained in combination depends upon various factors. In general, this ratio will depend upon the total concentration of nickel sulphate and sodium dichromate, the ratio of nickel sulphate to sodium dichromate, the pH of the solution during precipitation, and the temperature of the solution. The total concentration can be varied within wide limits as can the ratio of nickel oxide to sodium dichromate. Also the pH concentration can be varied between approximately 7 and 13. The ratio of $NiO$ to $CrO_3$ can be increased by increasing the ratio of nickel sulphate to sodium dichromate, by increasing the pH, or by increasing the total concentration, and conversely this ratio can be decreased by decreasing any of these factors. In actual practice it has been found desirable to keep the total concentration, pH concentration, and temperature constant and to vary the ratio of nickel sulphate to sodium dichromate.

After the desired aggregate has been formed, this aggregate is ground to a substantially uniform degree of fineness, preferably such that 98% or 99% of the product will pass through a 200-mesh screen. It is desirable to keep the particle size as uniform as possible and to avoid any large proportion of fines.

The ground aggregate is then leached with a solution which will render the chromium oxide soluble so that the aggregate may be washed substantially free therefrom. The solution preferably used is a caustic soda solution. The concentration of the caustic soda solution may vary from substantially 5% to 20% and preferably should be approximately 10%. If too concentrated a leaching solution is employed, uniform leaching is not obtained. It is important that the leaching be gradual and should be carried out as slowly as is consistent with commercial operations. In general, it may be stated that the lower the concentration, the better is the product produced, so long as the solubles are sufficiently removed. Enough leaching solution should be used to remove substantially the last traces of chromium trioxide, and for a superior product two 5% solutions employed in succession have in some instances been found desirable. The leaching is preferably carried out at an elevated temperature and with agitation.

The leached product is filtered and carefully washed substantially free of soluble sulphates, chromates, and caustic. This product is again dried, and the resultant product is a friable material which can be crushed in the fingers. It is not necessary to re-grind the dried filter cake, but it is preferably passed through a pulverizer or rolls to separate the particles thereof. The leached and dried material is reduced in an atmosphere of hydrogen and is discharged from the reducing zone into a vegetable oil without intermediate contact with the external atmosphere, in which form it is ready to be further dispersed in a glyceride oil for hydrogenation purposes. The rate and degree of reduction should be carefully controlled since these factors will vary with the ratio of $NiO$ to $CrO_3$ and the nature of the leaching. In general, a complete reduction does not produce the most selective catalyt, and a partial reduction is desirable. A possible explanation is that the presence of small percentages of suboxides of nickel are desirable, or it may be that complete reduction destroys the desired surface structure of the particles.

As a specific example of the process of making a highly selective catalyst, 1359 pounds of nickel sulphate were dissolved in approximately 1500 gallons of water and 120 pounds of sodium dichromate dissolved in approximately 200 gallons of water. The sodium dichromate solution was then added to the nickel sulphate solution. The solution was agitated and a caustic soda solution added during agitation until a pH concentration of 8 was reached. At this time the solution occupied a total volume of approximately 1800 gallons and was allowed to stand for about 48 hours to enable the precipitate to reach a uniform composition. At the end of this period it was filtered and the filter cake washed until it was substantially free of soluble sulphates and chromates. The filter cake was then dried in an air-circulating steam-heated drier for a period of about 16 hours, at the end of which time it would readily crumble in the hand. This aggregate, upon analysis, showed a ratio of nickel oxide to chromium trioxide of approximately $6NiO:CrO_3$.

The dried aggregate produced was ground in a pulverizing mill in closed circuit with a mechanical air separator for blowing out the fine material. The product was ground to a degree of fineness such that 98% to 99% would pass through a 200-mesh screen. The grinding was conducted so that no substantial portion of fines was present in the product.

This ground aggregate was leached by adding 360 pounds thereof to a solution made by dissolving 140 pounds of caustic soda in 160 gallons of water. After the aggregate was added, the solution was brought up to the boiling point, and the aggregate subjected to leaching at this temperature for a period of about 3 hours. The leaching was conducted in iron tanks equipped with steam coils for heating.

The leached aggregate was then filtered through a plate and frame filter press and washed substantially free of soluble solvents, chromates, and caustic. This leached aggregate was dried in the drier above referred to to form a friable material which was again passed through the pulverizer mill so as to separate the particles of the dried product. This product contained small quantities of chromium in combination, which chromium was evidently present within the particles of the aggregate and covered by nickel so that it was not removed by the leaching solution. Since this chromium was not upon the surface of the particles, it apparently had no effect upon the properties of the catalyst.

The leached and dried product was reduced at a temperature of 400° C. in an atmosphere of hydrogen in a furnace in which the catalyst traveled countercurrent to the hydrogen flow. Approximately 10 cubic feet of hydrogen were employed for each pound of nickel introduced into the furnace. The resulting foraminate product was discharged from the furnace directly into a drum containing vegetable oil without contact with external atmosphere.

In the process of making the catalyst, the washing of the filtered aggregate from the precipitation step is of importance since the presence of substances soluble in the leaching solution and not in chemical union with the nickel apparently modifies the structure of the dried aggregate and, therefore, the structure of the final catalyst. It has been found that the presence of such solubles results in the formation of a final catalyst which produces undesirable quantities of iso-olein when hydrogenating glyceride oils containing higher unsaturates than olein. By substantially completely removing such solubles, the catalyst will function against large concentrations of olein without the formation of substantial quantities of iso-olein. If it is desired to produce iso-olein, the ratio of iso-olein to olein can be controlled by varying the amount of such solubles left in the dried aggregate from the precipitation step.

However, the presence of such solubles in the dried aggregate also changes the selective characteristics of the catalyst with respect to the formation of saturated glycerides. In general, it is desirable to chemically fix a radical to the nickel which is soluble in the leaching solution, such as the $CrO_3$ herein disclosed, for the purpose of preventing the formation of saturated glycerides, and that any material, soluble in the leaching solution, which is present in the aggregate and not chemically fixed to the nickel will cause the formation of iso-olein and change the selective characteristics of the catalyst against the formation of stearin. Since either or both the combined solubles and the uncombined solubles can be varied, it is possible to produce catalysts forming practically any desirable ratio of iso-olein to stearin.

In making the nickel-chromate aggregate, other chromates than sodium dichromate may be used, for example, $K_2CrO_7$, $Na_2CrO_4$, as well as chromic acid, $H_2CrO_4$. The method of making selective catalysts is also applicable to catalysts made from other aggregates than those containing NiO and $CrO_3$. It has been found that the same general process is applicable to catalysts prepared from aggregates containing various ratios of nickel to aluminum. These aggregates were prepared by adding caustic soda to a solution containing dissolved nickel and aluminum sulphates to form a precipitated aggregate which was thereafter filtered, dried, leached, again dried, and reduced. In this manner aggregates ranging in composition from $3NiO:Al_2O_3$ to $20NiO:Al_2O_3$ were prepared and processed into nickel catalysts.

These aggregates were all prepared by adding caustic soda to a solution containing dissolved nickel and aluminum sulphates, the caustic soda addition being made until the solution was just slightly alkaline to litmus paper. Precipitation was made at room temperature and in tanks provided with thorough mixing equipment. The concentration of nickel in all cases was such that 100 pounds of nickel (453 pounds of nickel sulphate crystals) were present in 600 gallons of solution, and the amount of aluminum sulphate was varied to produce the desired ratios of nickel to aluminate. The precipitated material was filtered in a plate and frame press, washed free of soluble salts, and dried for 16 to 24 hours in an air circulating drier at a temperature of 85 to 90° C. This dried product was ground and sized to 200-mesh by a pulverizer mill and a mechanical air separator.

Two hundred pounds of the 200-mesh product were leached in a 20% caustic soda solution, made by adding 150 pounds of caustic soda at 90 gallons of water, at room temperature. The leaching solution containing the aggregate was agitated and gradually brought up to the boiling point in about one hour's time, and leaching was continued at the boiling point for a period of about three hours.

When the leaching operation was completed, the product was filtered in a plate and frame press and washed free of soluble salts. The filter cake was then dried, broken up in the pulverizing mill, and reduced with hydrogen at a temperature of 900° F., a hydrogen flow of 10 cubic feet per pound of nickel being employed.

In this manner, aggregates having approximately the following ratios of nickel oxide were prepared and processed to nickel catalysts:

$3NiO:Al_2O_3$
$4NiO:Al_2O_3$
$5NiO:Al_2O_3$
$10NiO:Al_2O_3$
$13NiO:Al_2O_3$
$17NiO:Al_2O_3$
$20NiO:Al_2O_3$

These catalysts were then tested for selectivity.

Since the selectivity of a catalyst in hydrogenating glyceride oil, both against the formation of stearin and iso-olein, depends upon the amount of solid fats formed in hydrogenating a given oil under given hydrogenation conditions, it is evident that the melting point of a semisolid fat at a given iodine number is an index of selectivity. Conversely the iodine number for a given melting point is such an index, and the catalyst which will produce an oil having the lowest iodine number for a given melting point will be the most selective. This is also an index of the selectivity of a catalyst in converting higher unsaturates than linolein into the next lower unsaturate before converting appreciable amounts of the said lower unsaturate, since it has been found that a catalyst which will function against a higher olein content before reaching a breakdown point will also function against a higher linolein content, etc.

Each of the catalysts having the ratio of NiO to $Al_2O_3$, above tabulated, was used to hydrogenate cottonseed oil under the same conditions of hydrogenation. The hydrogenation was carried out in each case with 160-pound batches of oil in a turbo-unit equipped with two 6-inch impellers driven at 468 R. P. M. All hydrogenations were made with .2% nickel at 300° F. and at 25 pounds hydrogen pressure. The iodine number at 34° C., Wiley melting point, was plotted against the pounds of aluminum oxide per 100 pounds of nickel contained in the aggregate. This curve is shown in Figure 1 and shows that the curve reached a pronounced minimum at $13NiO:Al_2O_3$, corresponding to an iodine number of approximately 70. This was the most selective catalyst obtained, and it will be observed that hydrogenation became less selective as the ratio of NiO to $Al_2O_3$ became either greater or smaller. Similar curves result if higher or lower melting points are selected and the minimum iodine point is reached at the same nickel oxide-aluminum oxide ratio although, of course, the iodine number will be lower or higher, respectively.

In order to make a highly selective catalyst from the nickel oxide-aluminum oxide aggregate, it has been found that the aluminum content can be varied between 10 and 17 pounds per 100 pounds of nickel if the final pH of precipitation is varied from 8 to 12 and dilution varied from 400 to 1000 gallons per 100 pounds of nickel present. The larger quantity of aluminum requires the greater dilution and the higher pH of precipitation. Throughout this variation the products had substantially the same characteristics, but larger or smaller quantities of alumina produced catalysts of poorer selective characteristics.

While the nickel-aluminum catalyst having $13NiO:Al_2O_3$ was found to be much more selective than conventional catalysts now used, it has been found to be not quite so selective as the catalyst made from $6NiO:CrO_3$ aggregate, first described. This is believed to be due to the fact that it has been found impossible to remove all of the sulphates not definitely in chemical union with the nickel prior to drying and leaching.

A typical example of analysis of an aggregate of the nickel-aluminum type in the more selective region is as follows:

| | Per cent |
|---|---|
| Nickel as Ni | 47.6 |
| Alumina as $Al_2O_3$ | 6.40 |
| Sulphates as $SO_3$ | 9.18 |

An analysis of an aggregate of the $6NiO:CrO_3$ type resulting from the commercial product of this catalyst shows the following compositions:

| | Per cent |
|---|---|
| Nickel as Ni | 52.3 |
| Chromate as $CrO_3$ | 13.6 |
| Sulphate as $SO_3$ | trace |

A comparison of these two catalysts upon soya bean oil using .2% catalyst at 300° F. and 25 pounds of hydrogen pressure in the turbo-unit having two 6-inch impellers driven at 565 R. P. M. is shown by the curves of Figure 2. In this figure the Wiley melting points in degrees centigrade are plotted against the iodine numbers of the oil. It will be noted that at a given melting point the iodine number with the nickel-chromate catalyst was appreciably smaller than that for the nickel-alumina-sulphate catalyst, indicating that the olein content of the oil was higher in the case of the nickel-chromate catalyst before saturates formed in substantial quantities. For example, at the 34° C. melting point selected for Figure 1, the iodine number of the oil was approximately 8 points lower with the nickel-chromate catalyst. Soya bean oil was selected for these curves because of its relatively high percentage of olein and linolein as compared to cottonseed oil, thereby putting a greater strain of olein concentration upon the catalyst, so as to magnify the differences between the catalysts.

The curves shown in Figure 3 present a comparison between the results obtained by the catalysts of the present invention and prior catalysts and show the Wiley melting point plotted against the iodine number. The upper curve was drawn on the basis of data obtained from the literature reported to be the best results obtained on cottonseed oil under the most favorable conditions. The two lower curves represent the results obtained from the nickel-aluminum catalyst and the nickel-chromate catalyst of the present invention. These lower curves represent tests carried on under conditions adverse for the functioning of a selective catalyst, which conditions are those used to determine the selectivity of commercial catalysts prepared according to the present invention. In securing the data for the two lower curves, the rate of hydrogen absorption was held very high by increasing the hydrogen pressure to 50 pounds per square inch. The temperature was 150° C. and thorough agitation employed. Even under these adverse conditions it will be noted that the Wiley melting point of the oil for a given iodine number is very much lower for the catalyst of the present invention than is the same Wiley melting point for the same iodine number for prior catalysts even under the most favorable conditions. For example, at an iodine number of approximately 70, the melting point for the nickel-chromium catalyst is approximately 32, for the nickel-aluminum-sulphate catalyst approximately 34, while for the prior catalyst it is approximately 41.

With more favorable conditions of hydrogenation, it is obvious that the catalyst of the present invention would produce a hydrogenated product having an even lower melting point, at, for example, 70 iodine number. It is pointed out that the lower the iodine number for a given melting point, the better are the keeping and shortening qualities of the product, and that this low iodine number indicates high olein to linolein concentration and low iso-olein content and, therefore, a more selective catalyst.

Another way of defining the selectivity of a catalyst is in terms of the maximum olein content which can be reached with a given oil under given conditions of hydrogenation. Since catalysts are not perfectly selective, a small amount of saturates is continuously formed while the olein content is increasing. The more selective catalyst will form smaller amounts of saturates before the break-down point is reached. When the break-down point of olein concentration is reached, saturates are formed rapidly and the olein concentration again decreases. Just before the break-down point is reached, the maximum olein concentration will be reached, and the more selective the catalyst, the higher this maximum concentration will be. Also there is a maximum concentration which could, theoretically, be obtained if all of the higher unsaturates were converted into olein without the formation of any saturates. These values for cottonseed oil and soya bean oil are approximately 75 and 87.5, respectively. The percentage of the theoretical maximum concentration actually obtained, that is, the effective selectivity, is also an index of selectivity. Another index is the ratio of olein to linolein at the maximum concentration of olein. Tables of these factors as to both cottonseed oil and soya bean oil, comparing the best results obtained with prior catalysts according to the literature with a nickel catalyst, are as follows:

Cottonseed Oil
Theoretical maximum olein concentration 75%

| | Maximum olein concentration obtained | Percentage of theoretical (effective selectivity) | Maximum ratio of olein to linolein |
|---|---|---|---|
| | Percent | Percent | |
| Prior catalysts | 48 | 64 | 5.4 |
| Present catalyst | 60 | 80 | 15 |

Soya Bean Oil
Theoretical maximum olein concentration 87.5%

| | Maximum olein concentration obtained | Percentage of theoretical (effective selectivity) | Maximum ratio of olein to linolein |
|---|---|---|---|
| | Percent | Percent | |
| Prior catalysts | 51 | 58 | 3 |
| Present catalyst | 68 | 77.7 | 12.4 |

It will be noted that the maximum olein concentration obtained by the catalyst of the present invention is from 12% to 17% greater, the effective selectivity is from 16% to 17.7% greater, and the maximum ratio of olein to linolein is 3 to 4 times greater.

The highly selective catalyst of this invention, for example, one produced from an aggregate having a molecular proportion of $6NiOCrO_3$ and carefully washed to remove substances soluble in the leaching solution, is particularly adapted for the production of liquid oils having excellent keeping qualities from oils having substantial quantities of linolenin or higher unsaturates. Examples of such oils are soya bean oil or fish oils such as sardine, menhaden, or herring oils. Since soya bean oil, which has notoriously poor keeping qualities, has a high olein content and contains substantial quantities of linolenin, it has not heretofore been possible to hydrogenate this oil into a palatable oil having good keeping qualities without the formation of substantial quantities of iso-olein and any substantial increase in saturates.

A specific example of the hydrogenation of an average commercial soya bean oil employing the highly selective catalyst of this invention is given below:

| | Original oil | Resulting oil |
|---|---|---|
| Saturates | 12.5 | 12.1 |
| Iso-olein | 0 | Less than 2% |
| Olein | 24.4 | 45.1 |
| Linolein | 55.1 | 42.8 |
| Linolenin | 3 | 0 |
| Iodine number | 135 | 115 |

The resulting product was liquid with no bad odor or taste and was tested for keeping qualities by the Wesson rancidity test at 210° to 212° F. and gave a rancidity test of approximately 11 hours. This is superior to natural oils which have the best keeping qualities known, such as corn oil or sesame oil.

It will be noted that the linolenin content was eliminated, the linolein content reduced, the olein content increased by approximately 16%, and very little iso-olein produced. It will further be noted that the saturates were actually decreased to a slight extent. This condition has been too consistently noted in operations employing the present catalyst for producing liquid hydrogenated oils to be the result of experimental errors.

The conditions under which the hydrogenation was carried on were those which were the most favorable, consistent with commercial operation. In the above example, 160 pounds of oil were placed in a turbo mixing unit of the type disclosed in U. S. Patent No. 1,856,120 to K. S. Valentine, having two 6-inch impellers. The impellers were driven at a speed of 565 R. P. M. in the presence of .05% nickel catalyst at a temperature of 300° to 310° F. for 62 minutes. The hydrogen pressure was adjusted to give a gas absorption rate of approximately 4.6 cubic feet per minute per 1000 pounds of oil so that 45.6 cubic feet of hydrogen were absorbed.

In general, the most favorable conditions for the production of a good liquid oil are (1) a small amount of catalyst, (2) thorough agitation, (3) high temperatures, and (4) a low rate of gas absorption. High temperatures assist in preventing the formation of saturates, but since high temperatures also favor the formation of iso-olein, the property of the present catalyst to resist the formation of iso-olein is of particular importance. The small amount of catalyst, thorough agitation, and low rate of gas absorption all tend to prevent local high concentrations of olein at the surface of the catalyst particles so that the break-down concentration of olein is not reached at the catalytic surface with resultant formation of stearin. By "thorough agitation" is meant such agitation as is accomplished by an agitator of the type shown in U. S. Patent No. 1,856,120, holding 160 pounds of oil up to the top impeller and having two 6-inch impellers rotating at 565 R. P. M. so as to give a peripheral speed of approximately 887 feet per minute. Of course, other types of apparatus can be employed, providing that thorough agitation is accomplished.

To produce a semi-solid fat having unusually high shortening and keeping qualities, the liquid hydrogenated soya bean oil produced above may be more rapidly hydrogenated down to the semi-solid state by increasing the amount of catalyst and increasing the hydrogen pressure so as to increase the rate of hydrogen absorption. For example, such a semi-solid fat having the following composition and iodine number has been thus prepared:

| | |
|---|---|
| Saturates | 25.9 |
| Olein | 70.4 |
| Linolein | 37 |
| Linolenin | 0 |
| Iodine No. | 67.2 |

This is to be contrasted with the composition of two hydrogenated cottonseed semi-solid compositions now on the market as shortenings.

| | No. 1 | No. 2 |
|---|---|---|
| Saturates | 35.0 | 35.3 |
| Olein | 51.1 | 52.6 |
| Linolein | 13.6 | 12.1 |
| Iodine number | | 66.8 |

The higher olein content and lower linolein content resulting from the employment of the present catalyst upon soya bean oil result in a longer keeping semi-solid fat having greatly improved shortening qualities. These properties may be somewhat improved by bringing the oil down to the semi-solid fat at the lower rate of hydrogenation described relative to producing the liquid oil.

The catalyst of the present invention is not only adapted for the hydrogenation of soya bean oil but has marked advantages for use with other oils. Fish oils such as sardine, menhaden, and herring oil, all of which contain linolenin and even high unsaturates and are notoriously poor in keeping qualities, can be hydrogenated into liquid and semi-solid products comparable to the soya bean products hereinbefore discussed. The disappearance of linolenin from soya bean oil and other oils containing unsaturates of this order, such as fish oils, occurs at approximately 110 to 115 iodine number, which is approximately 25 iodine numbers higher than with conventional commercial catalysts.

Also oils having high olein content and no linolenin or higher unsaturates, such as corn, sesame, or sunflower oils, can be improved. These oils are known to have the best keeping qualities of any of the more common vegetable oils, but since the catalyst of the present invention will operate selectively against high olein concentrations, the olein content of these oils can be increased by selectively hydrogenating their linolein content without the formation of substantial quantities of saturates or iso-olein so as to produce hydrogenated liquid oils having materially improved keeping qualities. Cottonseed oil, from which the saturates have been removed by chilling, may also be classed with these high olein content oils having no linolenin. Furthermore, the catalyst of the present invention may be employed to form semi-solid fats with properties comparable to the soya bean semi-solid fat hereinbefore described from corn, sesame, sunflower, or cottonseed oil. Another important advantage of the catalyst of the present invention in hydrogenating oils is the relatively large particle size as compared to many previous catalysts and the resulting ease with which it may be filtered from the oil.

In the examples of oil or fat compositions given in this specification, the saturates, total olein, and linolein were determined from the thiocyanogen and iodine numbers, both of which are obtained as a result of titration methods, are more accurate than the older methods involving fatty acid separation, and are standard methods at the present time. The iso-olein was determined by the Twitchell lead salt-alcohol method, which is a standard method at the present time. It is, of course, understood that the original oils hereinbefore described were treated by the usual refining methods before hydrogenating and that the products of hydrogenation were submitted to the usual steam deodorization before testing for edible properties.

While the selective catalysts of the present invention find particular utility in the hydrogenation of glyceride oils and the selectivity of the said catalysts have been defined in terms of such oils, the invention is not limited thereto. For example, the catalysts of the present invention have been found to have much greater selectivity toward the formation of carbon dioxide and hydrogen, to the exclusion of carbon monoxide and hydrogen, when employed for the catalysis of the reaction between hydrocarbons and steam. Also the general method of making selective satalysts nerein disclosed have been found applicable in the making of iron oxide, copper oxide, and other oxide and metal catalysts. It is, therefore, to be understood that the present invention is not to be limited to the details described but may be varied within the scope of the following claims.

I claim as my invention:

1. The method of making a selective catalyst which comprises forming into particles a mass consisting essentially of NiO and $CrO_3$ in a ratio of approximately 6 to 1, gradually dissolving substantially all of the $CrO_3$ content from said particles, and partially reducing said particles.

2. A method of making a selective catalyst which comprises forming into particles a mass consisting essentially of NiO and $Al_2O_3$ in a ratio of approximately 13 to 1, gradually dissolving substantially all of the $Al_2O_3$ content from said particles, and partially reducing said particles.

3. The method of making a selective catalyst which comprises forming into particles a mass containing $6NiO:CrO_3$ which is substantially free of constituents not chemically attached to the nickel, gradually dissolving substantially all of the $CrO_3$ content of said particles, and partially reducing the remainder.

4. A selective catalyst comprising a foraminate nickel particle prepared by leaching the $CrO_3$ content from particles consisting essentially of NiO and $CrO_3$ in a ratio of approximately 6 to 1.

5. A selective catalyst comprising foraminate nickel particles prepared by leaching and reducing particles consisting essentially of NiO and $Al_2O_3$ in a ratio of approximately 13 to 1.

6. The process of carrying out a catalytic reaction, comprising, bringing at least two fluid substances capable of partaking in more than one reaction with each other at an appreciable reaction velocity under the same conditions of reaction including temperature and pressure into contact with a leached metal oxide catalyst under said conditions of reaction, said catalyst being one which is prepared by forming an aggregate having one metal oxide chemically fixed to another metal oxide, one of said metal oxides being catalytically active for the promotion of more than one of said reactions and the other metal oxide being one which is capable of being leached from the catalytically active metal oxide without shattering the particles of said aggregate, said metal oxides being chemically fixed to one another in substantially that proportion which will give the final catalyst the property of promoting said reactions with a greater ratio of reaction velocity of one of said reactions to the reaction velocity of any other of said reactions than will result when the catalyst is prepared with any other proportions, and leaching said other metal oxide from the aggregate without shattering the particles.

7. The process of carrying out a catalytic reaction, comprising, bringing at least two fluid substances capable of partaking when in contact with a catalyst in more than one reaction with each other at an appreciable reaction velocity under the same conditions of reaction including temperature and pressure into contact with a leached and at least partly reduced metal oxide catalyst under said conditions of reaction, said catalyst being one which is prepared by forming an aggregate having one metal oxide chemically fixed to another metal oxide, the metal of one of said metal oxides being catalytically active for the promotion of more than one of said reactions and the other metal oxide being one which is capable of being leached from the catalytically active metal oxide without shattering the particles of said aggregate, said metal oxides being chemically fixed to one another in substantially that proportion which will give to the final catalyst the property of promoting said reactions with a greater ratio of reaction velocity of one of said reactions to the reaction velocity of any other of said reactions than will result when the catalyst is prepared with any other proportions, leaching said other metal oxide from the aggregate without shattering the particles, and at least partly reducing said catalytically active metal oxide.

8. The process of carrying out a catalytic reaction, comprising, bringing at least two fluid substances capable of partaking when in contact with a nickel catalyst in more than one reaction with each other at an appreciable reaction velocity under the same conditions of reaction including temperature and pressure into contact with a leached metal catalyst containing nickel under said conditions of reaction, said catalyst being one which is prepared by forming an aggregate having a nickel oxide chemically fixed to a chromium oxide, the nickel of said nickel oxide being catalytically active for the promotion of more than one of said reactions and the chromium oxide being capable of being leached from the nickel oxide without shattering the particles of said aggregate, said oxides being chemically fixed to one another in substantially that proportion which will give to the final catalyst the property of promoting said reactions with a greater ratio of reaction velocity of one of said reactions to the reaction velocity of any other of said reactions than will result when the catalyst is prepared with any other proportions, leaching substantially all of said chromium oxide from said aggregate without shattering the particles, and at least partly reducing said nickel oxide.

9. The process of carrying out a catalytic reaction, comprising, bringing at least two fluid substances capable of partaking when in contact with a nickel catalyst in more than one reaction with each other at an appreciable reaction velocity under the same conditions of reaction including temperature and pressure into contact with a leached metal catalyst containing nickel under said conditions of reaction, said catalyst being one which is prepared by forming an aggregate having a nickel oxide chemically fixed to an aluminum oxide, the nickel of said nickel oxide being catalytically active for the promotion of more than one of said reactions and the aluminum oxide being capable of being leached from the nickel oxide without shattering the particles of said aggregate, said oxides being chemically fixed to one another in substantially that proportion which will give to the final catalyst the property of promoting said reactions with a greater ratio of reaction velocity of one of said reactions to the reaction velocity of any other of said reactions than will result when the catalyst is prepared with any other proportions, leaching substantially all of said aluminum oxide from said aggregate without shattering the particles, and at least partly reducing said nickel oxide.

10. The process of carrying out catalytic hydrogenation which comprises bringing hydrogen and another fluid substance capable of partaking when in contact with a catalyst in more than one reaction with said hydrogen at an appreciable reaction velocity under the same conditions of reaction including temperature and pressure into contact with a leached and at least partly reduced metal oxide catalyst under said conditions of reaction, said catalyst being one which is prepared by forming an aggregate having one metal oxide chemically fixed to another metal oxide, the metal of one of said oxides being catalytically active for the promotion of more than one of said reactions and the other metal oxide being one which is capable of being leached from the catalytically active metal oxide without shattering the particles of said aggregate, said metal oxides being chemically fixed to one another in substantially that proportion which will give to the final catalyst the property of promoting said reactions with a greater ratio of reaction velocity of one of said reactions to the reaction velocity of any other said reactions than will result when the catalyst is prepared with any other proportions, leaching said other metal oxide from the aggregate without shattering the particles and at least partly reducing said catalytically active metal oxide.

LESLIE G. JENNESS.